US012626212B2

(12) United States Patent
Zhao

(10) Patent No.: US 12,626,212 B2
(45) Date of Patent: May 12, 2026

(54) DISTRIBUTION ROBOT, AND CONTROL METHOD AND CONTROL DEVICE THEREOF

(71) Applicant: BEIJING JINGDONG ZHENSHI INFORMATION TECHNOLOGY CO., LTD., Beijing (CN)

(72) Inventor: Yang Zhao, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 428 days.

(21) Appl. No.: 18/550,589

(22) PCT Filed: Dec. 17, 2021

(86) PCT No.: PCT/CN2021/138977
§ 371 (c)(1),
(2) Date: Sep. 14, 2023

(87) PCT Pub. No.: WO2022/193760
PCT Pub. Date: Sep. 22, 2022

(65) Prior Publication Data
US 2024/0296413 A1 Sep. 5, 2024

(30) Foreign Application Priority Data

Mar. 15, 2021 (CN) .......................... 202110276375.0

(51) Int. Cl.
*G06Q 10/083* (2024.01)
*B25J 11/00* (2006.01)
(Continued)

(52) U.S. Cl.
CPC .......... *G06Q 10/083* (2013.01); *B25J 11/008* (2013.01); *G01B 11/24* (2013.01); *G01G 19/414* (2013.01)

(58) Field of Classification Search
CPC ..... G06Q 10/083; G06Q 10/08; B25J 11/008; B25J 11/00; B25J 9/16; B25J 9/161;
(Continued)

(56) References Cited

U.S. PATENT DOCUMENTS 9,315,344 B1 4/2016 Lehmann
10,509,128 B1 12/2019 Lee
(Continued)

FOREIGN PATENT DOCUMENTS

CN 101532826 A 9/2009
CN 207556646 U 6/2018
(Continued)

OTHER PUBLICATIONS

"International Search Report and Written Opinion of the International Searching Authority", with English-language machine translation, International Application No. PCT/CN2021/138977, Mar. 15, 2022, 15 pp.
(Continued)

*Primary Examiner* — A. Hunter Wilder
(74) *Attorney, Agent, or Firm* — Myers Bigel, P.A.

(57) ABSTRACT

The present disclosure provides a distribution robot, and a control method and control device thereof, relating to the field of logistics distribution. According to the present disclosure, a top plane of a distribution robot body is fully used, a touch screen is vertically arranged on one side of the top plane, and parcel contour measuring units are arranged on the top plane of the distribution robot body and the touch screen, such that whether the size of a parcel exceeds a range can be determined very conveniently and rapidly; and a gravity sensing device is arranged below the top plane, such that the distribution robot can automatically weigh and price the parcel and determine whether the total weight of the parcel exceeds the range.

15 Claims, 6 Drawing Sheets

(51) Int. Cl.
    *G01B 11/24*     (2006.01)
    *G01G 19/414*     (2006.01)

(58) Field of Classification Search
    CPC . B25J 13/006; B25J 13/06; B25J 13/08; B25J
            19/02; G01B 11/24; G01G 19/414; G06F
                              3/0488
    See application file for complete search history.

(56)            References Cited

U.S. PATENT DOCUMENTS

| | | | |
|---|---|---|---|
| 11,656,621 | B2 | 5/2023 | Takai et al. |
| 2002/0106273 | A1 | 8/2002 | Huang et al. |
| 2014/0173394 | A1 | 6/2014 | Kashibuchi |
| 2017/0192438 | A1 | 7/2017 | Morimoto et al. |
| 2020/0402340 | A1 | 12/2020 | Lossov et al. |
| 2022/0084208 | A1 | 3/2022 | Canepa et al. |

FOREIGN PATENT DOCUMENTS

| | | | |
|---|---|---|---|
| CN | 108682081 | A | 10/2018 |
| CN | 109426941 | A | 3/2019 |
| CN | 109753977 | A | 5/2019 |
| CN | 110525314 | A | 12/2019 |
| CN | 209850934 | U | 12/2019 |
| CN | 110800003 | A | 2/2020 |
| CN | 110834852 | A | 2/2020 |
| CN | 210464391 | U | 5/2020 |
| CN | 211309747 | U | 8/2020 |
| CN | 111971534 | A | 11/2020 |
| CN | 112093361 | A | 12/2020 |
| CN | 212158494 | U | 12/2020 |
| CN | 212196612 | U | 12/2020 |
| CN | 112809707 | A | 5/2021 |
| CN | 215149138 | U | 12/2021 |
| DE | 2528209 | A1 | 12/1976 |
| JP | 2000511146 | A | 8/2000 |
| JP | 2017122990 | A | 7/2017 |
| JP | 2019131374 | A | 8/2019 |
| JP | 2021086212 | A | 6/2021 |
| WO | 2009070696 | A1 | 6/2009 |

OTHER PUBLICATIONS

"First Office Action and English language translation", CN Application No. 202110276375.0, May 21, 2024, 13 pp.

Yu, Yuqing , et al., "Fingertip haptic rendering system for touch screen image perception" with English language abstract, Chinese Journal of Scientific Instrument, vol. 38, No. 6, Jun. 2017, pp. 1523-1530.

"Notice of Handling Registration Procedures" and English language translation, CN Application No. 202110276375.0, Sep. 25, 2024, 8 pp.

Yan, Shu-Tian , et al., "Investigation and discussion of stereo-warehouse for automatic storage and delivery of postal parcels", Journal of Gansu University of Technology, vol. 25, No. 3, Sep. 1999, 4 pp.

"Notice of Reasons for Refusal and English language translation", JP Application No. 2023-556832, Feb. 3, 2026, 6 pp.

10

12

132
(172)

14

11

DISTRIBUTION ROBOT, AND CONTROL METHOD AND CONTROL DEVICE THEREOF

CROSS-REFERENCE TO RELATED APPLICATIONS

This application is a U.S. National Stage application under 35 U.S.C. § 371 of International Patent Application No PCT/CN2021/138977, filed on Dec. 17, 2021, which itself is based on and claims priority to Chinese patent application No. 202110276375.0, filed on Mar. 15, 2021, the disclosures of both of which are hereby incorporated by reference in their entireties.

TECHNICAL FIELD

This disclosure relates to the field of logistics distribution, and in particular to a distribution robot and a control method and a control device thereof.

BACKGROUND

With the development of intelligent logistics, a distribution robot can deliver a package to a user, thereby reaching a purpose of contactless distribution.

When a distribution man is ready to deliver the package to the distribution robot, the distribution man needs to observe and judge with naked eyes whether a size of the package is greater than a compartment size of the distribution robot, and even needs to manually try whether the package can be stuffed into the compartment, which is inconvenient and inefficient.

The distribution man weighs the package by using a scale to determine a price therefrom. Regardless of the weight of the package, the package is stuffed into the distribution robot for distribution, so that many times the distribution robot already runs in overload, which seriously affects the performance and lifespan of the distribution robot.

The distribution man performs manual weighing and pricing, and the price is manually entered into an applet before sent to the user, which is cumbersome and inefficient.

SUMMARY

Some embodiments of the present disclosure provide a distribution robot, comprising:

a distribution robot body, a gravity sensing device arranged below a top plane of the distribution robot body, a touch screen vertically arranged on one side of the top plane of the distribution robot body, and a package contour detection unit for detecting whether an external contour of a package to be delivered exceeds a maximum external contour of a deliverable package, which is arranged on the top plane and on the touch screen of the distribution robot body.

In some embodiments, the package contour detection unit comprises:

one or more of a first infrared sensing device or first contour identification information arranged along a contour line of a maximum area at a bottom of the deliverable package on the top plane of the distribution robot body, and one or more of a second infrared sensing device or second contour identification information arranged along a contour line of a maximum area on a side of the deliverable package on the touch screen.

In some embodiments, the touch screen is a liftable touch screen.

In some embodiments, the distribution robot further comprises: a processor configured to control the touch screen to rise until a portion of the package contour detection unit located at a position of lowermost contour line of the maximum area on the side of the deliverable package on the touch screen is flush with the top plane of the distribution robot body after the gravity sensing device senses the package to be delivered.

In some embodiments, the touch screen comprises one or more of a first display area for whether a size of a package exceeds a range, a second display area for package weight information sensed by the gravity sensing device, a third display area for package weighing and pricing information, and a control button area for package delivery or distribution.

In some embodiments, the distribution robot further comprises: a communication unit configured to send package distribution information to a target user.

In some embodiments, the distribution robot further comprises: a processor configured to control a control button of Start Delivery to be displayed on the touch screen if a size of the package to be delivered does not exceed a range and a total weight of the package to be delivered and delivered packages does not exceed a maximum carrying weight, control an idle compartment to be opened to deliver the package to be delivered after detecting that a user taps the control button of Start Delivery, control a control button of Start Distribution to be displayed on the touch screen when detecting that the compartment is closed, and control the distribution robot to start distribution after detecting that the user taps the control button of Start Distribution.

Some embodiments of the present disclosure provide a control method of a distribution robot, comprising:

sensing that a package to be delivered is placed on a top plane of a distribution robot body by a sensing data of a gravity sensing device arranged below the top plane of the distribution robot body;

judging whether a size of the package to be delivered exceeds a range by a package contour detection unit arranged on the top plane and on a touch screen of the distribution robot body;

judging whether a total weight of the package to be delivered and delivered packages exceeds a maximum carrying weight according to a weight of the package to be delivered currently sensed by the gravity sensing device and a weight of delivered packages previously sensed and recorded;

controlling an idle compartment to be opened to deliver the package to be delivered if the size of the package to be delivered does not exceed the range and the total weight of the package to be delivered and the delivered packages does not exceed the maximum carrying weight; and controlling the distribution robot to start distribution.

In some embodiments, the control method further comprising: controlling the touch screen to rise until a portion of the package contour detection unit located at a position of lowermost contour line of the maximum area on the side of the deliverable package on the touch screen is flush with the top plane of the distribution robot body after sensing that the package to be delivered is placed on the top plane of the distribution robot body.

In some embodiments, the judging whether a size of the package to be delivered exceeds a range comprises: judging whether the size of the package to be delivered exceeds the range by the sensing data of a first infrared sensing device and a second infrared sensing device in the case that the package contour detection unit comprises the first infrared sensing device arranged along a contour line of a maximum area at a bottom of the deliverable package on the top plane of the distribution robot body and the second infrared sensing device arranged along a contour line of a maximum area on a side of the deliverable package on the touch screen.

In some embodiments, the judging whether a size of the package to be delivered exceeds a range comprises: judging whether the size of the package to be delivered exceeds the range by a control data of a control button for whether a size of a package exceeds a range on the touch screen in the case that the package contour detection unit comprises first contour identification information arranged along a contour line of a maximum area at a bottom of the deliverable package on the top plane of the distribution robot body and second contour identification information arranged along a contour line of a maximum area on a side of the deliverable package on the touch screen, wherein the control data is obtained by a user controlling the control button for whether a size of a package exceeds a range based on a comparison of an external contour of the package to be delivered with the first contour identification information and the second contour identification information.

In some embodiments, the control method further comprising: calculating a distribution price of the package to be delivered according to the weight of the package to be delivered currently sensed by the gravity sensing device.

In some embodiments, the control method further comprising: sending one or more of whether the size of the package to be delivered exceeds the range, the weight of the package to be delivered, whether the total weight of the package to be delivered and delivered packages exceeds the maximum carrying weight, and the distribution price of the package to be delivered to the touch screen for display.

In some embodiments, the control method further comprising: sending package distribution information to a target user by a communication unit, the package distribution information comprising one or more of a pickup point, a distribution vehicle number, express delivery information, a pickup code, a compartment number, and a distribution status.

Some embodiments of the present disclosure provide a control device of a distribution robot, comprising: a memory; and a processor coupled to the memory, the processor being configured to perform the control method of a distribution robot based on instructions stored in the memory.

Some embodiments of the present disclosure provide a non-transitory computer-readable storage medium stored a computer program which implements the steps of the control method of a distribution robot when executed by a processor.

BRIEF DESCRIPTION OF THE DRAWINGS

The drawings that need to be used in the description of the embodiments or the related art will be briefly discussed below. The present disclosure can be more clearly understood according to the following detailed description, which proceeds with reference to the accompanying drawings.

It is obvious that the drawings in the following description are merely some embodiments of the present disclosure and for one of ordinary skill in the art, other drawings can be obtained without paying out creative efforts.

DETAILED DESCRIPTION

The technical solutions in the embodiments of the present disclosure will be clearly and completely described below with reference to the drawings in the embodiments of the present disclosure.

Unless specifically stated otherwise, the expressions of "first", "second", etc. in this disclosure are used for distinguishing different objects, rather than indicating meanings such as magnitude or time sequence.

A traditional distribution robot only has a package distribution function, as a result, distribution-related judgments such as whether a size of a package exceeds a range, package weighing and pricing, and whether a total weight of packages exceeds a range, are cumbersome and inefficient.

In the embodiments of the present disclosure, a top plane of a distribution robot body is fully utilized, and by vertically arranging a touch screen on one side of the top plane and arranging a package contour detection unit on the top plane and on the touch screen of the distribution robot body, it can be very conveniently and quickly determined whether a package size exceeds a range, and by using a gravity sensing device arranged below the top plane, the distribution robot is enabled to automatically perform package weighing and pricing and the judgment of whether a total weight of packages exceeds a range, so that operations are simple and efficient.

An exemplary distribution process of a distribution robot is as follows:

a distribution man delivering a package into a compartment of the distribution robot;

the distribution robot accurately acquiring a position of a place for distribution by using map big data, such as indoor map big data, and starting the distribution;

the distribution robot accurately delivering the package to a target position by using techniques such as infrared rays, radar detection, and robot-elevator coordination and sensing in the distribution; and a user arriving at a pickup point, scanning a code and taking the package out of the compartment of the distribution robot, thus a unmanned distribution task is completed, which can be applied to a indoor unmanned distribution scenario or other distribution scenarios.

Figure 1A:
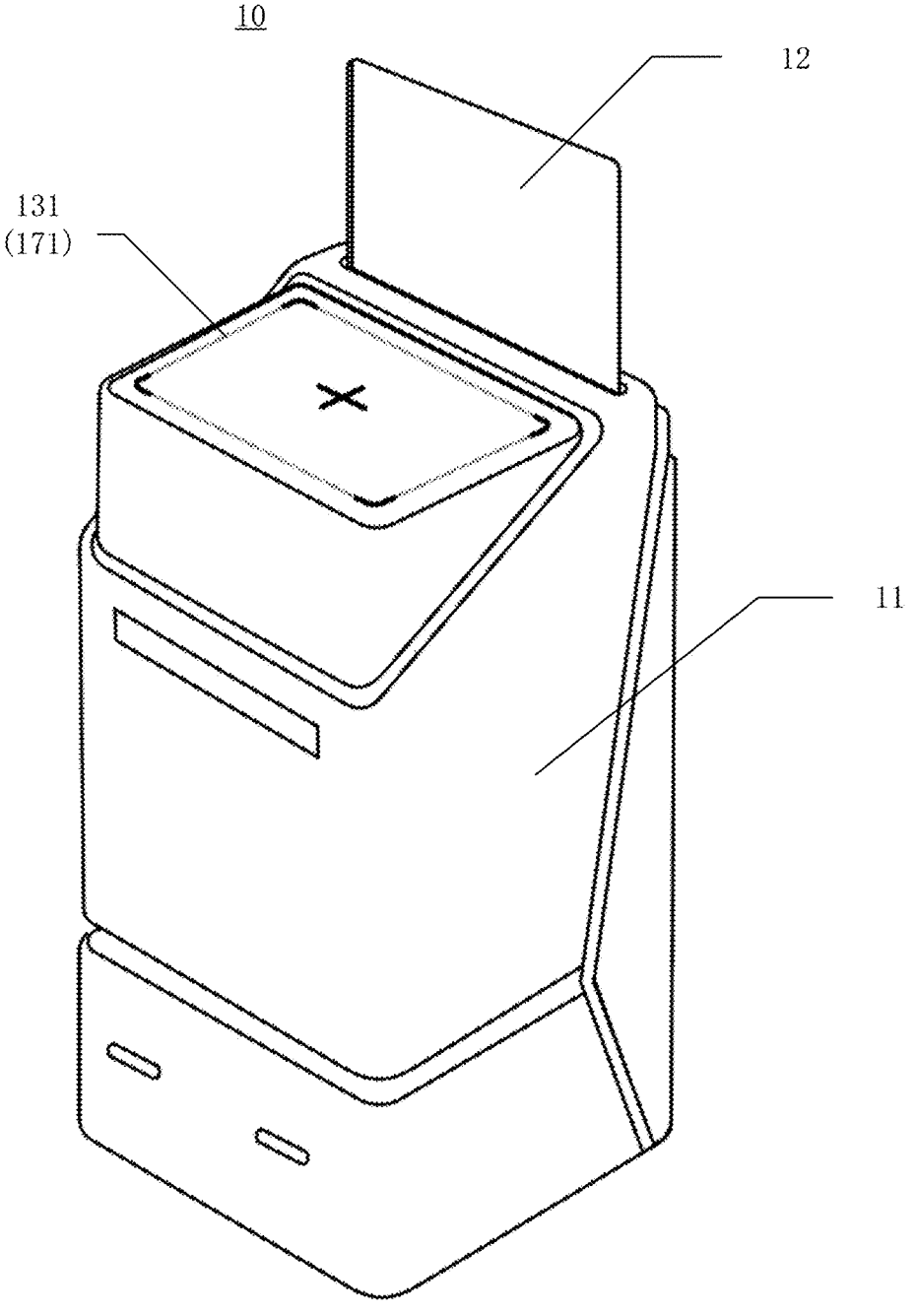
FIG. 1a illustrates a three-dimensional view of a distribution robot according to some embodiments of the present disclosure.

FIG. 1a illustrates a three-dimensional view of a distribution robot according to some embodiments of the present disclosure.

Figure 1B:
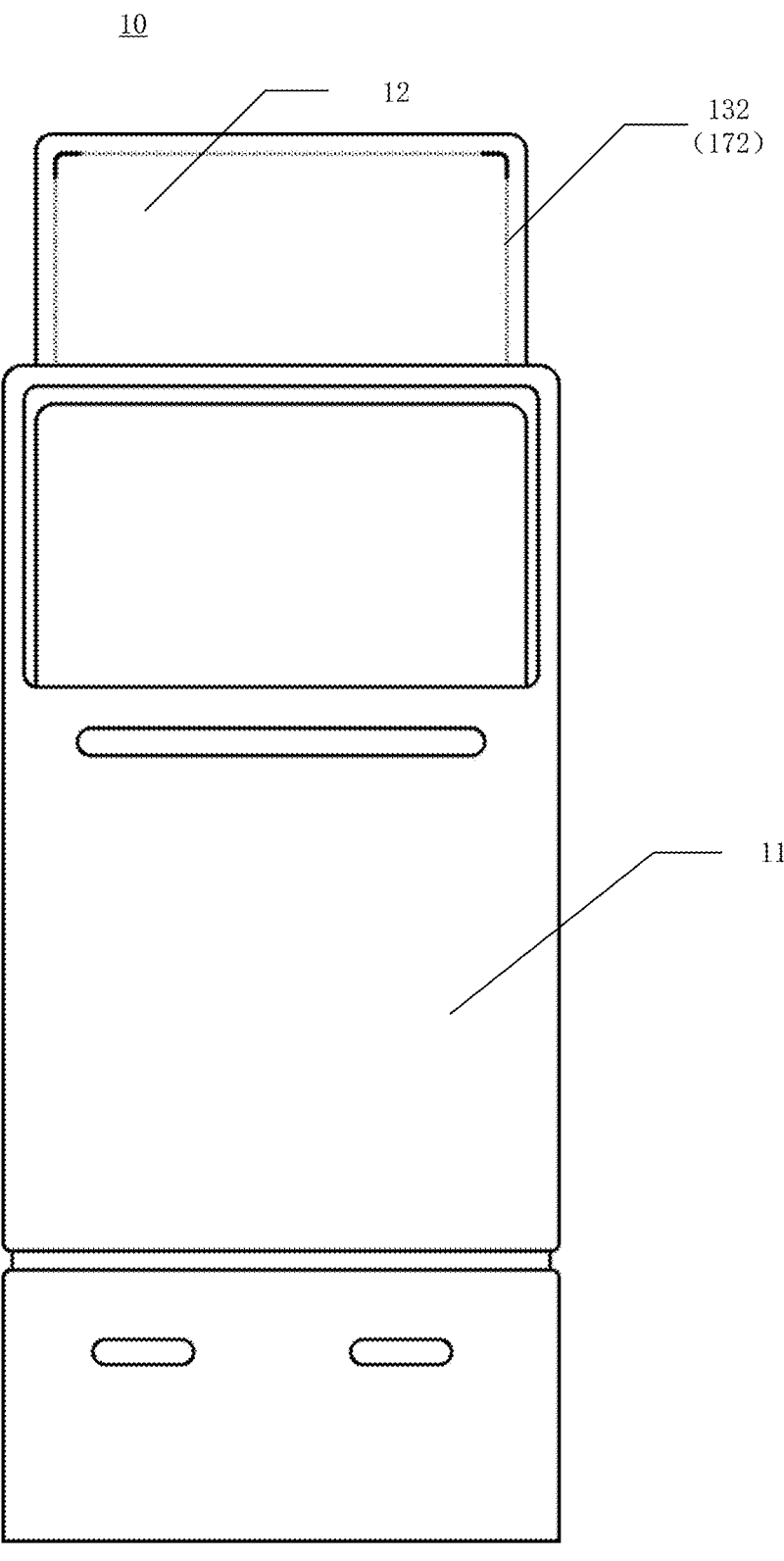
FIG. 1b illustrates a front view of a distribution robot according to some embodiments of the present disclosure.

FIG. 1b illustrates a front view of a distribution robot according to some embodiments of the present disclosure.

Figure 1C:
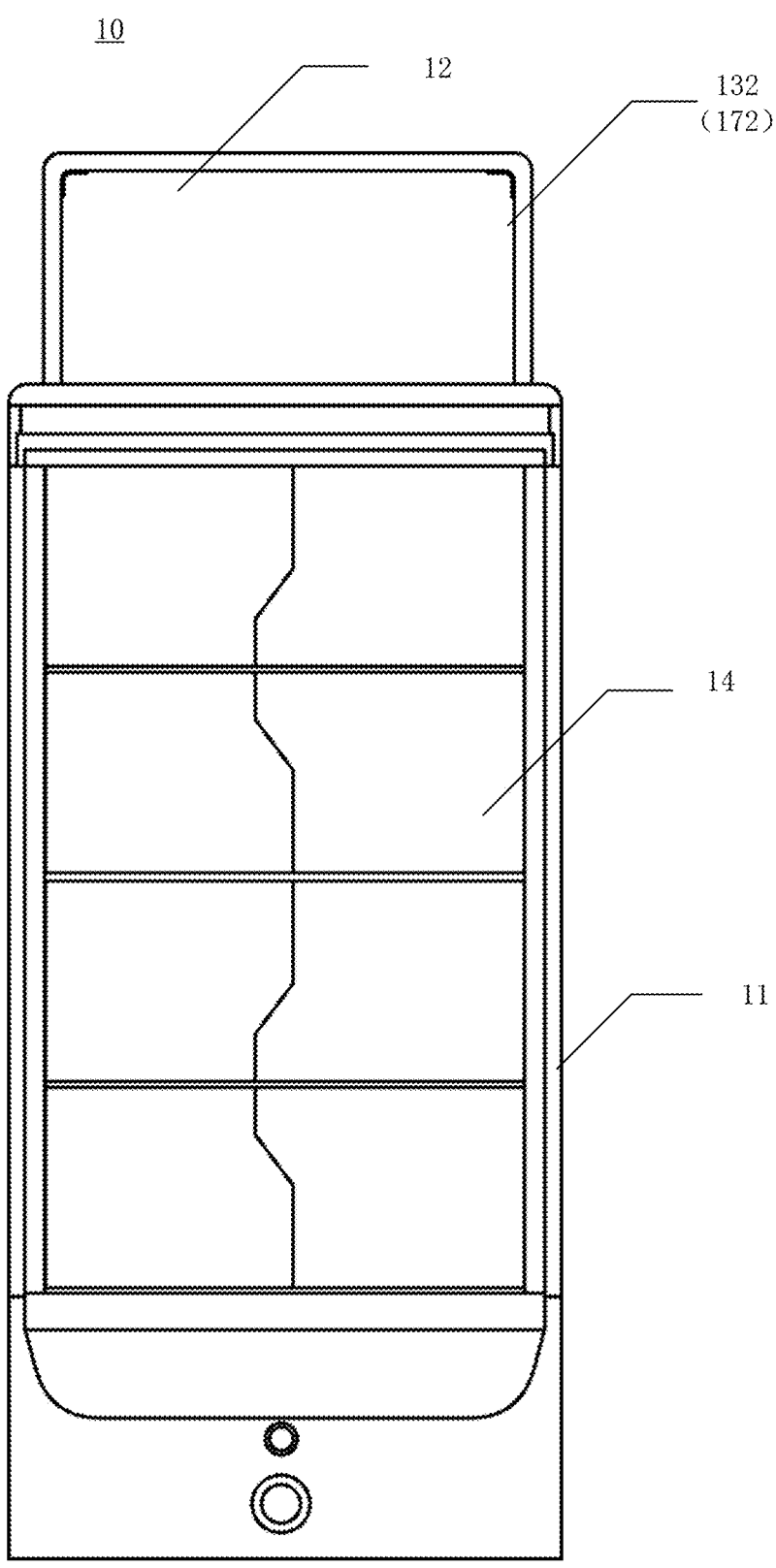
FIG. 1c illustrates a rear view of a distribution robot according to some embodiments of the present disclosure.

FIG. 1c illustrates a rear view of a distribution robot according to some embodiments of the present disclosure.

Figure 1D:
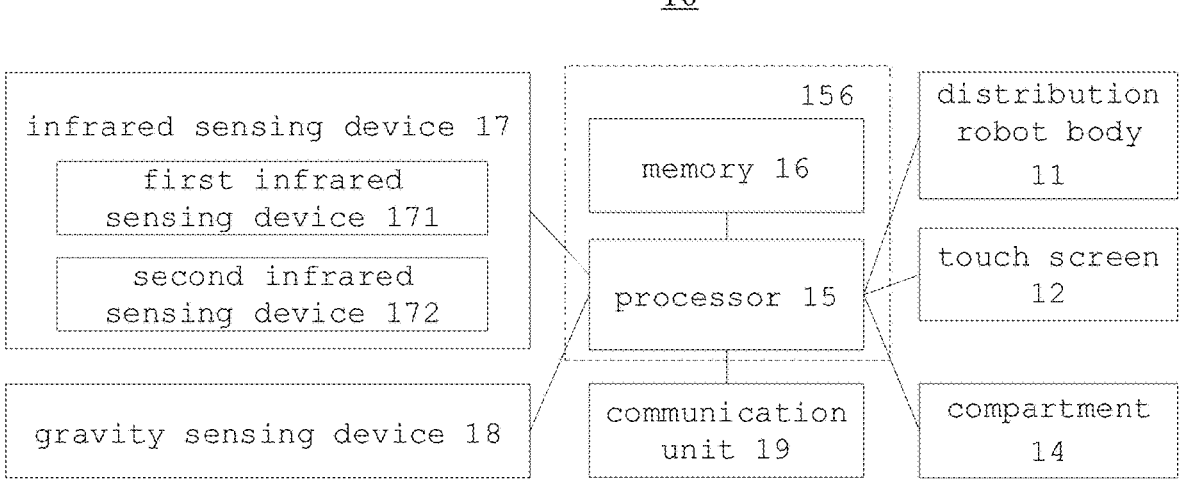
FIG. 1d illustrates a schematic view of internal assemblies of a distribution robot according to some embodiments of the present disclosure.

FIG. 1d illustrates a schematic diagram of internal assemblies of a distribution robot according to some embodiments of the present disclosure.

The distribution robot 10 is described below with reference to FIGS. 1a to 1d.

The distribution robot 10 comprises a distribution robot body 11. One or more compartments 14 are arranged in the distribution robot body 11 for loading packages. Typically, one compartment is loaded with one package.

The distribution robot 10 further comprises a touch screen 12 vertically arranged on one side of a top plane of the distribution robot body 11. The touch screen 12 can be, for example, liftable. The touch screen 12 can rise or fall according to usage needs to protect the touch screen 12. The touch screen 12 is, for example, a glass touch screen.

The distribution robot 10 further comprises: a package contour detection unit for detecting whether an external contour of a package to be delivered exceeds a maximum external contour of a deliverable package, which is arranged on the top plane and on the touch screen of the distribution robot body, for example, along a contour line of a maximum area at a bottom of the deliverable package on the top plane of the distribution robot body and along a contour line of a maximum area on a side of the deliverable package on the touch screen.

One implementation of the package contour detection unit is as follows: arranging first contour identification information 131 along the contour line of the maximum area at the bottom of the deliverable package on the top plane of the distribution robot body 11, and arranging second contour identification information 132 along the contour line of the maximum area on the side of the deliverable package on the touch screen 12. By means of the first contour identification information 131 and the second contour identification information 132, a maximum size of the deliverable package can be delimited. The first contour identification information 131 and the second contour identification information 132 can, for example, take a form of identification such as an auxiliary line. A distribution man, based on the assistance of the maximum size of the deliverable package delimited by the contour identification information, can very conveniently and quickly determine whether a size of a package exceeds a range by observing and comparing an external contour of the package with the first contour identification information and the second contour identification information, and then, by tapping a control button for whether a size of a package exceeds a range on the touch screen 12, the distribution robot is enabled to know whether the size of the package exceeds the range.

Another implementation of the package contour detection unit is as follows: arranging a first infrared sensing device 171 along the contour line of the maximum area at the bottom of the deliverable package on the top plane of the distribution robot body 11, and arranging a second infrared sensing device 172 along the contour line of the maximum area on the side of the deliverable package on the touch screen 12. The first infrared sensing device 171 and the second infrared sensing device 172 are collectively referred to as an infrared sensing device 17. If a package exceeds a maximum size of the deliverable package delimited by the infrared sensing device 17, an infrared signal emitted by the infrared sensing device 17 will be blocked, and the distribution robot knows that the size of the package exceeds the range according to a change in infrared sensing data, thereby fully automatically sensing whether the size of the package exceeds the range.

The above two implementations of the package contour detection unit can be used concurrently. That is, the first infrared sensing device and the first contour identification information are concurrently arranged along the contour line of the maximum area at the bottom of the deliverable package on the top plane of the distribution robot body; and the second infrared sensing device and the second contour identification information are concurrently arranged along the contour line of the maximum area on the side of the deliverable package on the touch screen.

The distribution robot 10 further comprises a gravity sensing device 18 arranged below the top plane of the distribution robot body 11. A weight of the package can be sensed by the gravity sensing device 18.

In some embodiments, the distribution robot further comprises: assemblies such as a memory 16, a processor 15 coupled to the memory 16, and a communication unit 19. The processor 15 is electrically connected with the memory 16, the infrared sensing device 17, the gravity sensing device 18, the communication unit 19, the touch screen 12 (containing various control buttons), and the compartment 14 (or opening/closing control means of the compartment 14).

The memory 16 and the processor 15 are collectively referred to as a control device 156 of a distribution robot. The processor 15 is configured to perform a control method of a distribution robot based on instructions stored in the memory 16, which is described in detail later. The memory 16 can include, for example, a system memory, a fixed non-volatile storage medium, and the like. The system memory has thereon stored, for example, an operating system, an application program, a boot loader, and other programs, etc.

In some embodiments, the processor 15 is configured to calculate a price for delivering the package based on the weight of the package according to a relationship between weight and price. A pricing rule can be configured. Therefore, the function of package automatic weighing and pricing is achieved.

In some embodiments, the processor 15 is configured to judge whether a total weight of the package to be delivered and delivered packages exceeds a maximum carrying weight based on the weight of the package to be delivered currently sensed by the gravity sensing device 18 and a weight of the delivered packages previously sensed and recorded, thereby automatically judging whether the total weight of the packages exceeds the range.

In some embodiments, the processor 15 is configured to control, after the gravity sensing device 18 senses the package to be delivered, the touch screen 12 to rise until a portion of the package contour detection unit located at a lowermost contour line position of the maximum area on the side of the deliverable package on the touch screen is flush with the top plane of the distribution robot body, thereby achieving automatic rise of the touch screen 12. In addition, the touch screen 12 can rise in a manner of button trigger or the like.

Figure 3A:
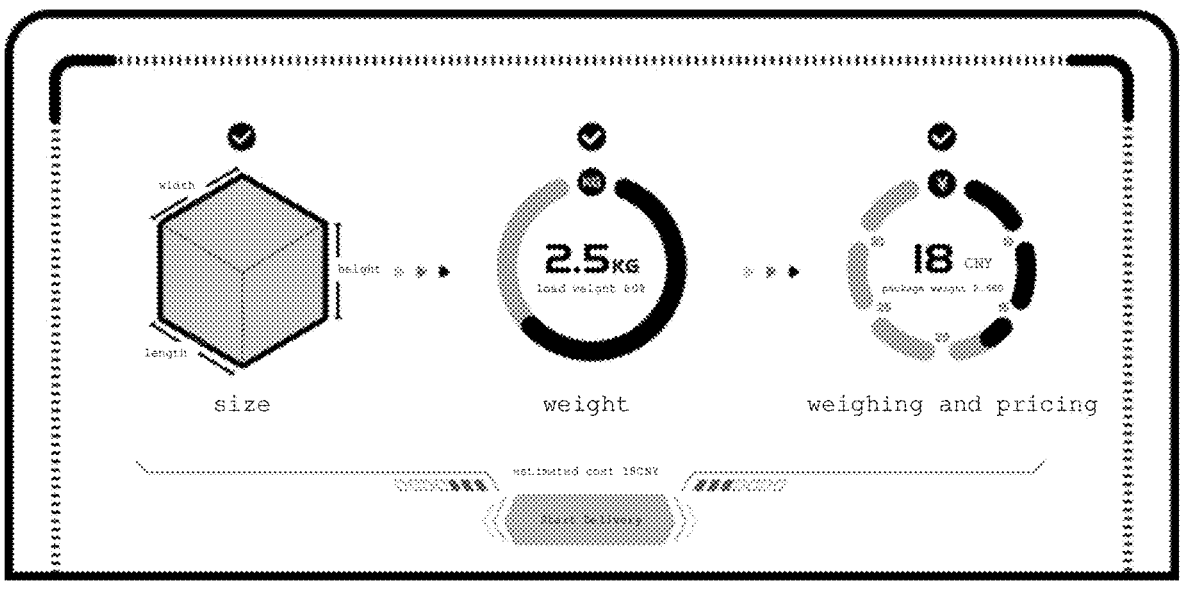
FIG. 3a illustrates a schematic diagram of displaying delivery success on a touch screen according to some embodiments of the present disclosure.

In some embodiments, as shown in FIG. 3a, the touch screen 12 comprises one or more of a first display area for whether a size of a package exceeds a range, a second display area for package weight information sensed by the gravity sensing device 18, a third display area for package weighing and pricing information, and a control button area for package delivery or distribution.

In some embodiments, the processor 15 is configured to control a control button of Start Delivery to be displayed on the touch screen 12 if the size of the package to be delivered does not exceed the range and the total weight of the package to be delivered and the delivered packages does not exceed the maximum carrying weight, control an idle compartment 14 to be opened to deliver the package to be delivered into the distribution robot through the compartment after detecting that the user taps the control button of Start Delivery, control a control button of Start Distribution to be displayed on the touch screen 12 when detecting that the compartment 14 is closed, and control the distribution robot to start distribution after detecting that the user taps the control button of Start Distribution.

In some embodiments, the communication unit 19 is configured to send package distribution information to a target user. The communication unit 19 can send the package distribution information to the target user based on the control of the processor 15. The package distribution information comprises one or more of a pickup point, a distribution vehicle number, express delivery information, a pickup code, a compartment number and a distribution status. The communication unit 19 can implement a communication function by using various cellular wireless communication technologies, wifi (Wireless Fidelity) wireless communication technologies, or other wireless communication technologies.

Figure 2:
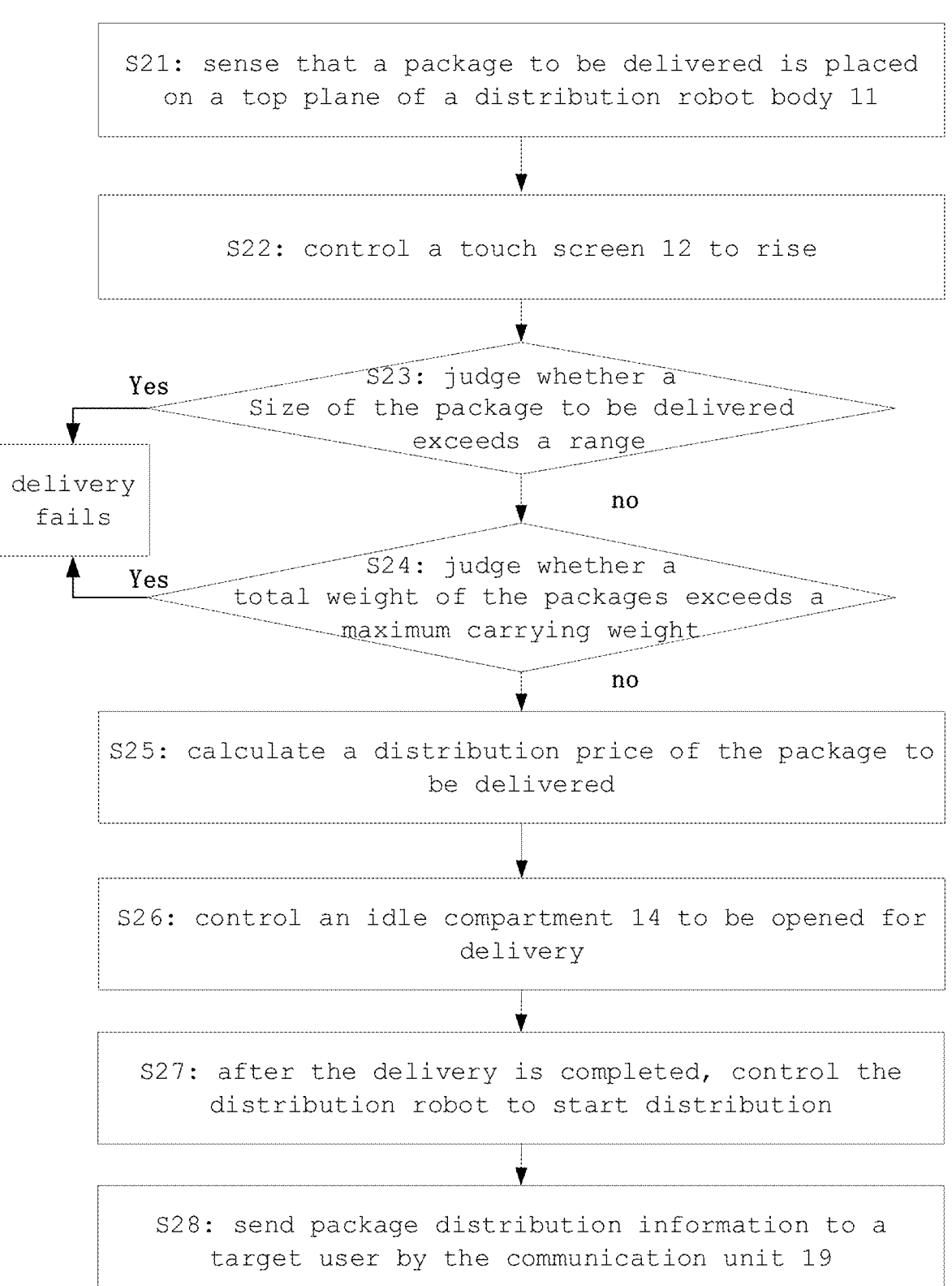
FIG. 2 illustrates a schematic flow diagram of a control method of a distribution robot according to some embodiments of the present disclosure.

FIG. 2 illustrates a schematic flow diagram of a control method of a distribution robot according to some embodiments of the present disclosure. The control method of a distribution robot can be executed, for example, by the control device 156 or the processor 15 of a distribution robot.

As shown in FIG. 2, the control method of a distribution robot comprises: step S21 to S28.

In the step S21, by sensing data of a gravity sensing device 18 arranged below a top plane of a distribution robot body 11, it is sensed that a package to be delivered is placed on the top plane of the distribution robot body 11.

A distribution man places the package to be delivered on the top plane of the distribution robot body 11, the gravity sensing device 18 arranged below the top plane senses a weight change, and sends the sensing data to a processor 15, and the processor 15, by a change in the sensing data, senses that the package to be delivered is placed on the top plane of the distribution robot body 11.

In the step S22, a touch screen 12 is controlled to rise until a portion of a package contour detection unit located at a lowermost contour line position of a maximum area on a side of a deliverable package on the touch screen is flush with the top plane of the distribution robot body.

After the processor 15 senses that the package to be delivered is placed on the top plane of the distribution robot body 11, the processor 15 control the touch screen 12 to rise to one preset position, so that the portion of the package contour detection unit located at the lowermost contour line position of the maximum area on the side of the deliverable package on the touch screen is flush with the top plane of the distribution robot body.

In the step S23, it is judged whether a size of the package to be delivered exceeds a range by the package contour detection unit arranged on the top plane and on the touch screen 12 of the distribution robot body 11.

One implementation is that: in the case that the package contour detection unit comprises first contour identification information arranged along a contour line of a maximum area at the bottom of the deliverable package on the top plane of the distribution robot body and second contour identification information arranged along a contour line of the maximum area on the side of the deliverable package on the touch screen, a user (such as the distribution man) can very conveniently and quickly determine whether the size of the package exceeds the range by observing and comparing an external contour of the package with the first contour identification information and the second contour identification information based on the assistance of a maximum size of the deliverable package delimited by the contour identification information, and then, by tapping a control button for whether a size of a package exceeds a range on the touch screen 12, the distribution robot is enabled to know whether the size of the package exceeds the range, and accordingly, the processor 15 judges whether the size of the package to be delivered exceeds the range by means of control data of the control button for whether a size of a package exceeds a range on the touch screen.

Another implementation is that: in the case that the package contour detection unit comprises the first infrared sensing device arranged along a contour line of a maximum area at the bottom of the deliverable package on the top plane of the distribution robot body and the second infrared sensing device arranged along a contour line of the maximum area on the side of the deliverable package on the touch screen, the processor 15 judges whether a size of the package to be delivered exceeds the range by sensing data of the first infrared sensing device and the second infrared sensing device. For example, if the package exceeds the maximum size of the deliverable package delimited by the infrared sensing device 17, an infrared signal emitted by the infrared sensing device 17 will be blocked, and the processor 15 will know that the size of the package exceeds the range based on a change in the infrared sensing data. Therefore, full-automatic sensing of whether the package size exceeds the range can be achieved, without the need of human intervention.

In the step S24, it is judged whether a total weight of the package to be delivered and the delivered packages exceeds a maximum carrying weight according to a weight of the package to be delivered currently sensed by the gravity sensing device 18 and a weight of the delivered packages previously sensed and recorded.

The processor 15 adds the weight of the package to be delivered currently sent by the gravity sensing device 18 and the previously sent and recorded weight of the delivered packages already delivered to compartments to calculate a total weight of the packages, and judges whether the total weight of the packages exceeds the maximum carrying weight of the distribution robot.

The step S23 and the step S24 are executed regardless of order.

In the step S25, a distribution price of the package to be delivered is calculated according to the weight of the package to be delivered currently sensed by the gravity sensing device 18.

The processor 15 calculates a price for delivering the package based on the weight of the package according to a relationship between weight and price. A pricing rule can be configured. Therefore, a package automatic weighing and pricing function can be achieved.

In the step S26, if the size of the package to be delivered does not exceed the range and the total weight of the package to be delivered and the delivered packages does not exceed the maximum carrying weight, an idle compartment 14 is controlled to be opened, so that the package to be delivered is delivered into the distribution robot through the idle compartment 14.

If the size of the package to be delivered exceeds the range or the total weight of the packages exceeds the maximum carrying weight, it is prompted that the delivery fails and is processed by the distribution man.

If there are still idle compartments 14 and another packages to be delivered, the steps S21 to S26 can be repeated to continue delivery.

In the step S27, after the delivery is completed, the distribution robot is controlled to start distribution.

In the delivery process, the processor 15 can send, to the touch screen 12 for display, one or more of whether the size of the package to be delivered exceeds the range, the weight of the package to be delivered, whether the total weight of the package to be delivered and the delivered packages exceeds the maximum carrying weight, and the distribution price of the package to be delivered. The processor 15 can also, according to control needs, display a control button for package delivery or distribution onto the touch screen 12, for the convenience of the operation by the distribution man.

Figure 3B:
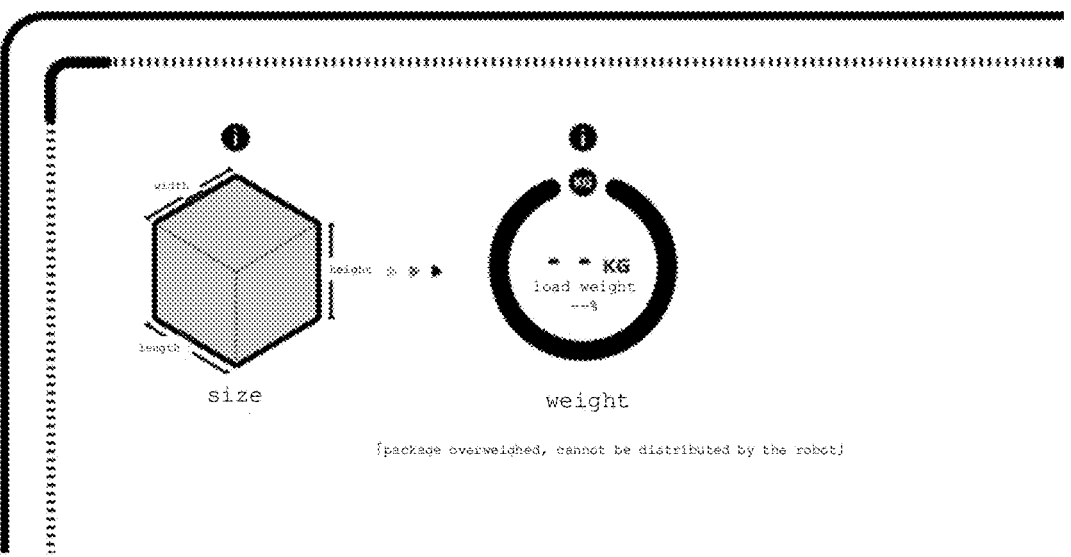
FIG. 3b illustrates a schematic diagram of displaying delivery failure on a touch screen according to some embodiments of the present disclosure.

As shown in FIG. 3_a_, ticks are all displayed for a package size item, a package weight item, and a package price item on the touch screen 12, which indicates that the package size does not exceed the range, that the total weight of the packages does not exceed the maximum carrying weight, and that the calculation of the package price is finished, then the distribution man can tap a "Start Delivery" control button, an idle compartment is opened, the package is delivered to the distribution robot through the compartment, then the compartment is closed, the control button on the touch screen 12 is changed from "Start Delivery" to "Start Distribution", and if the "Start Distribution" control button is tapped, the distribution robot starts to distribute the package. The package weight item not only can display the weight of the current packages, but also can display a percentage of the total weight of the packages to the maximum carrying weight, so that the distribution man knows a remaining delivery capacity of the distribution robot.

As shown in FIG. 3_b_, if the size of the package exceeds the range, a size problem is displayed at the package size item on the touch screen 12_a_, and it is prompted that, for example, "package oversized, cannot be delivered into the compartment". If the total weight of the packages exceeds the maximum carrying weight, a weight problem is displayed at the package weight item on the touch screen 12, and it is prompted that, for example, "package overweighed, cannot be distributed by the robot". The distribution man can timely know the problems affecting package delivery and adjust or handle them timely.

In the step S28, package distribution information is sent to a target user by the communication unit 19, the package distribution information comprising one or more of a pickup point, a distribution vehicle number, express delivery information (for example, an express delivery company, a courier number, etc.), a pickup code, a compartment number, and a distribution status (for example, being distributed, already arrived at the pickup point, etc.).

The processor 15 sends the package distribution information to the communication unit 19, and the communication unit 19 sends the package distribution information to the related target user by using its own communication function.

In the embodiments of the present disclosure, a top plane of a distribution robot body is fully utilized, and by vertically arranging a touch screen on one side of the top plane and arranging a package contour detection unit on the top plane and on the touch screen of the distribution robot body, it can be very conveniently and quickly determined whether a package size exceeds a range, and by using a gravity sensing device arranged below the top plane, the distribution robot is enabled to automatically perform package weighing and pricing and the judgment of whether a total weight of packages exceeds a range, so that operations are simple and efficient.

Some embodiments of the present disclosure provide a non-transitory computer-readable storage medium stored a computer program which implements the steps of the control method of a distribution robot in the embodiments when executed by a processor.

It should be appreciated by those skilled in the art that, the embodiments of the present disclosure can be arranged as a method, system, or computer program product. Accordingly, the present disclosure can take a form of an entire hardware embodiment, an entire software embodiment, or an embodiment combining software and hardware aspects. Furthermore, the present disclosure can take a form of a computer program product implemented on one or more non-transitory computer-readable storage media (including, but not limited to, a disk memory, CD-ROM, optical memory, etc.) having computer program code embodied therein.

The present disclosure is described with reference to the flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be arranged to a processor of a general-purpose computer, special-purpose computer, embedded processor, or other programmable data processing devices to produce a machine, such that the instructions, which are executed by the processor of the computer or other programmable data processing devices, create means for implementing functions specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including an instruction means which implements functions specified in one or more flows of the flow diagrams and/or one or more blocks of the block diagrams.

These computer program instructions can also be loaded onto a computer or other programmable data processing devices to cause a series of operational steps to be performed on the computer or other programmable devices to produce a computer-implemented process such that the instructions, which are executed on the computer or other programmable devices, provide steps for implementing functions specified in one or more flows of the flow diagrams and/or one or more blocks of the block diagrams.

The above descriptions are only the preferred embodiments of the present disclosure and not used for limiting this disclosure, and any modifications, equivalent substitutions, improvements and the like that are made within the spirit and principle of the present disclosure should be included within the protection scope of the present disclosure.

What is claimed is:

1. A distribution robot, comprising:
   a distribution robot body with an idle compartment, a gravity sensing device arranged below a top plane of the distribution robot body, a liftable touch screen vertically arranged on one side of the top plane of the distribution robot body, a package contour detection unit for detecting whether an external contour of a package to be delivered exceeds a maximum external contour of a deliverable package, which is arranged on the top plane and on the liftable touch screen of the distribution robot body, and a processor configured to control the liftable touch screen to rise until a portion of the package contour detection unit located at a position of lowermost contour line of a maximum area on a side of the deliverable package on the liftable touch screen is flush with the top plane of the distribution robot body after the gravity sensing device senses the package to be delivered.

2. The distribution robot according to claim 1, wherein the package contour detection unit comprises:

one or more of a first infrared sensing device or first contour identification information arranged along a contour line of a maximum area at a bottom of the deliverable package on the top plane of the distribution robot body, and one or more of a second infrared sensing device or second contour identification information arranged along the lowermost contour line of the maximum area on the side of the deliverable package on the liftable touch screen.

3. The distribution robot according to claim 1, wherein the liftable touch screen comprises one or more of a first display area for whether a size of a package exceeds a range, a second display area for package weight information sensed by the gravity sensing device, a third display area for package weighing and pricing information, and a control button area for package delivery or distribution.

4. The distribution robot according to claim 1, further comprising a communication unit configured to send package distribution information to a target user.

5. The distribution robot according to claim 1, further comprising a wherein the processor is further configured to control a control button of Start Delivery to be displayed on the liftable touch screen if a size of the package to be delivered does not exceed a range and a total weight of the package to be delivered and delivered packages does not exceed a maximum carrying weight, control the idle compartment to be opened to deliver the package to be delivered after detecting that a user taps the control button of Start Delivery, control a control button of Start Distribution to be displayed on the liftable touch screen when detecting that the compartment is closed, and control the distribution robot to start distribution after detecting that the user taps the control button of Start Distribution.

6. A control method of a distribution robot, comprising:

sensing, by a processor of the distribution robot, that a package to be delivered is placed on a top plane of a distribution robot body by sensing data of a gravity sensing device arranged below the top plane of the distribution robot body;

controlling, by the processor, a liftable touch screen to rise until a portion of a second package contour detection unit located at a position of lowermost contour line of a maximum area on a side of the package to be delivered on the liftable touch screen is flush with the top plane of the distribution robot body after sensing by the gravity sensing device that the package to be delivered is placed on the top plane of the distribution robot body;

judging, by the processor, whether a size of the package to be delivered exceeds a range by a first package contour detection unit arranged on the top plane and the second package contour detection unit arranged on the liftable touch screen of the distribution robot body;

judging, by the processor, whether a total weight of the package to be delivered and delivered packages exceeds a maximum carrying weight according to a weight of the package to be delivered currently sensed by the gravity sensing device and a weight of delivered packages previously sensed and recorded;

controlling, by the processor, an idle compartment to be opened to deliver the package to be delivered if the size of the package to be delivered does not exceed the range and the total weight of the package to be delivered and the delivered packages does not exceed the maximum carrying weight; and controlling, by the processor, the distribution robot to start distribution.

7. The control method according to claim 6, wherein the judging whether a size of the package to be delivered exceeds a range comprises:

judging whether the size of the package to be delivered exceeds the range by sensing data of a first infrared sensing device of the first package contour detection unit and a second infrared sensing device of the second package contour detection unit, in the case that the package contour detection unit comprises wherein the first infrared sensing device is arranged along a contour line of a maximum area at a bottom of the deliverable package on the top plane of the distribution robot body and the second infrared sensing device arranged along a contour line of a maximum area on a side of the deliverable package on the touch screen.

8. The control method according to claim 6, wherein the judging whether a size of the package to be delivered exceeds a range comprises:

judging whether the size of the package to be delivered exceeds the range by a control data of a control button for whether a size of a package exceeds a range on the liftable touch screen in the case that the first package contour detection unit comprises first contour identification information arranged along a contour line of a maximum area at a bottom of the deliverable package on the top plane of the distribution robot body and second contour identification information arranged along the lowermost contour line of the maximum area on the side of the deliverable package on the liftable touch screen, wherein the control data is obtained by a user controlling the control button for whether a size of a package exceeds a range based on a comparison of an external contour of the package to be delivered with the first contour identification information and the second contour identification information.

9. The control method according to claim 6, further comprising:

calculating a distribution price of the package to be delivered according to the weight of the package to be delivered currently sensed by the gravity sensing device.

10. The control method according to claim 9, further comprising:

sending one or more of whether the size of the package to be delivered exceeds the range, the weight of the package to be delivered, whether the total weight of the package to be delivered and delivered packages exceeds the maximum carrying weight, and the distribution price of the package to be delivered to the liftable touch screen for display.

11. The control method according to claim 6, further comprising:

sending package distribution information to a target user by a communication unit, the package distribution information comprising one or more of a pickup point, a distribution vehicle number, express delivery information, a pickup code, a compartment number, and a distribution status.

12. A control device of a distribution robot, comprising:
a memory; and
a processor coupled to the memory, the processor being configured to perform a control method of a distribution robot based on instructions stored in the memory, wherein the control method comprises:

sensing that a package to be delivered is placed on a top plane of a distribution robot body by sensing data of a gravity sensing device arranged below the top plane of the distribution robot body;

controlling a liftable touch screen to rise until a portion of a second package contour detection unit located at a position of lowermost contour line of a maximum area on a side of the package to be delivered on the liftable touch screen is flush with the top plane of the distribution robot body after sensing by the gravity sensing device that the package to be delivered is placed on the top plane of the distribution robot body;

judging whether a size of the package to be delivered exceeds a range by a first package contour detection unit arranged on the top plane and the second package contour detection unit arranged on the liftable touch screen of the distribution robot body;

judging whether a total weight of the package to be delivered and delivered packages exceeds a maximum carrying weight according to a weight of the package to be delivered currently sensed by the gravity sensing device and a weight of delivered packages previously sensed and recorded;

controlling an idle compartment to be opened to deliver the package to be delivered if the size of the package to be delivered does not exceed the range and the total weight of the package to be delivered and the delivered packages does not exceed the maximum carrying weight; and
controlling the distribution robot to start distribution.

13. A non-transitory computer-readable storage medium storing a computer program which implements the steps of the control method of the distribution robot according to claim 6 when executed by the processor.

14. The control device according to claim 12, wherein the judging whether a size of the package to be delivered exceeds a range comprises:

judging whether the size of the package to be delivered exceeds the range by sensing data of a first infrared sensing device of the first package contour detection unit and a second infrared sensing device of the second package contour detection unit, in the case that the package contour detection unit comprises wherein the first infrared sensing device is arranged along a contour line of a maximum area at a bottom of the deliverable package on the top plane of the distribution robot body and the second infrared sensing device arranged along a contour line of a maximum area on a side of the deliverable package on the touch screen.

15. The control device according to claim 12, wherein the judging whether a size of the package to be delivered exceeds a range comprises:

judging whether the size of the package to be delivered exceeds the range by a control data of a control button for whether a size of a package exceeds a range on the liftable touch screen in the case that the first package contour detection unit comprises first contour identification information arranged along a contour line of a maximum area at a bottom of the deliverable package on the top plane of the distribution robot body and second contour identification information arranged along the lowermost contour line of the maximum area on the side of the deliverable package on the liftable touch screen, wherein the control data is obtained by a user controlling the control button for whether a size of a package exceeds a range based on a comparison of an external contour of the package to be delivered with the first contour identification information and the second contour identification information.

* * * * *